Patented Dec. 20, 1938

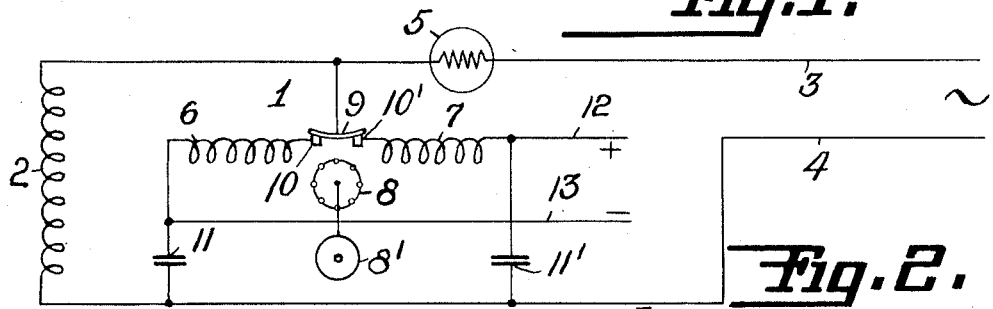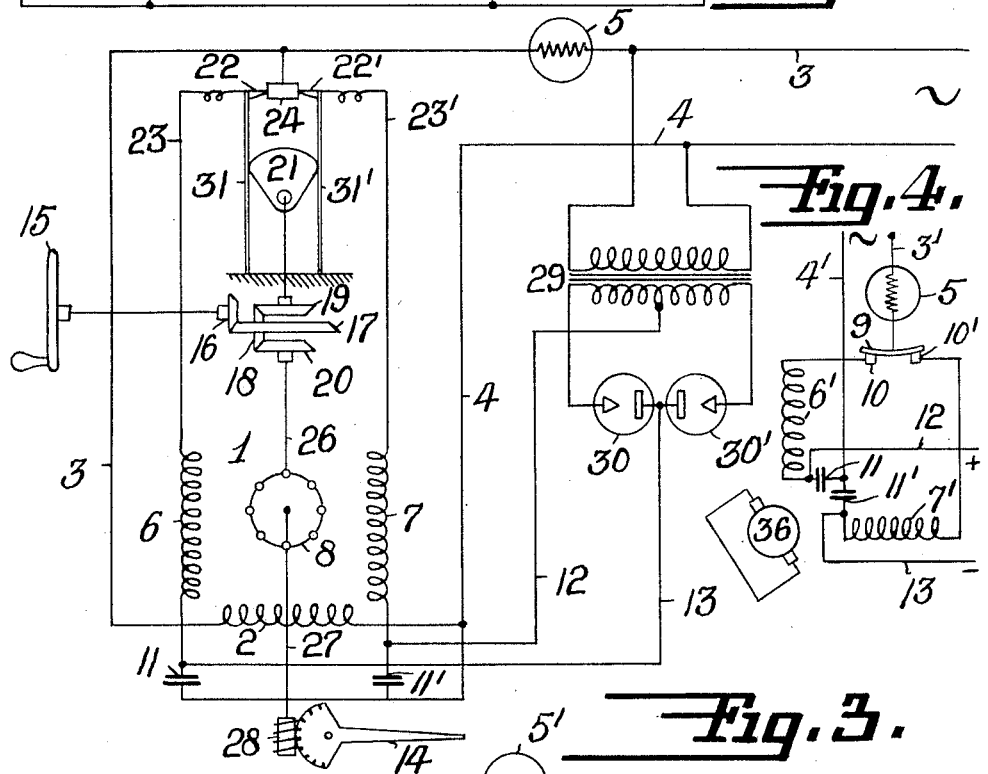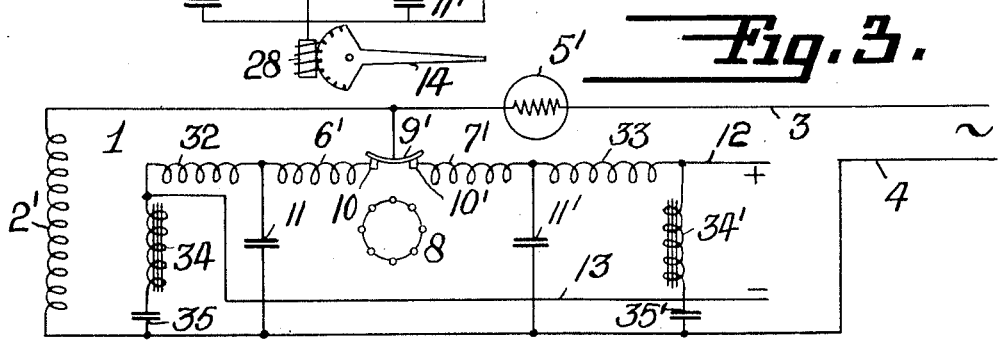

2,141,056

UNITED STATES PATENT OFFICE 2,141,056

POSITIONAL CONTROL SYSTEM

Frederic M. Watkins, Forest Hills, N. Y., assignor to Sperry Gyroscope Company, Inc., Brooklyn, N. Y., a corporation of New York Application March 19, 1936, Serial No. 69,626

15 Claims. (Cl. 172—239)

This invention relates, generally, to electrical control systems, and the invention has reference, more particularly, to a novel electrical positional control system employing an A. C. follow-up motor for operating a controlled object in response to the operation of a controlling object such, for example, as the operation of the rudder of a ship in response to the movements of the steering wheel or other controlling device.

Heretofore, considerable difficulty has been experienced in the operation of A. C. follow-up motors in endeavoring to stop the same with the desired rapidity, it being essential for satisfactory operation that the rate of deceleration of the motor be extremely high and that the connected load or controlled object be brought to rest in a dead beat manner and without overshooting or oscillation.

The principal object of the present invention is to provide a novel electrical positional control system employing an A. C. motor for driving a controlled object, means being provided for dynamically braking the motor to obtain exceedingly rapid stoppage thereof in use, thereby preventing overshooting or hunting of the motor.

Another object of the present invention lies in the provision of a novel electrical positional control system of the above character wherein the motor used is a reversible induction motor having its stator provided with main and auxiliary windings, dynamic braking being obtained during stopping by supplying D. C. to said auxiliary windings in series, thereby saturating or substantially saturating said stator so as to nullify the effect of said main winding and cause immediate stoppage of the motor.

Still another object of the present invention is to provide a novel positional control system wherein the driving motor used is wound multiple phase and is supplied from a single phase source, the desired phase shift being obtained through the use of suitable impedances, means being provided for preventing excessive A. C. current flow through the motor windings during stopping.

Other objects and advantages will become apparent from the specification, taken in connection with the accompanying drawing wherein the invention is embodied in concrete form.

In the drawing:

Fig. 1 is a wiring diagram illustrating the principles of the present invention.

Fig. 2 is a wiring diagram showing the application of the invention to a steering system.

Figs. 3 and 4 are wiring diagrams of modifications.

Similar parts are correspondingly numbered in the above views.

Referring now to Fig. 1 of the drawing, the reference numeral 1 designates an induction motor having a rotor 8 of the squirrel cage or other type, and a stator wound two phase, the stator having a main winding 2 constituting one phase winding of the motor, said winding 2 being supplied through leads 3 and 4 connected to a suitable single phase source. A ballast resistance 5 is shown connected in lead 3 in advance of motor 1 for the purpose of preventing excessive current flow to the motor. This ballast resistance may be of the self regulating "Amperite" type. Winding 2 is suitably distributed on the stator of motor 1 and since its terminals are directly connected to supply leads 3 and 4, the current flowing therein is substantially in phase with that of these leads.

The stator is provided with auxiliary windings or winding portions 6 and 7 which together constitute the second phase winding of the motor, said winding portions being alike and distributed so that the sections thereof lie intermediate the sections of the main winding 2, in the two phase manner, the windings 6 and 7 being arranged to be oppositely connected to the lead 3 so that the fields produced by these windings when supplied from the A. C. source are opposite for cooperating with the main winding 2 to provide opposite directions of rotation of the motor. Suitable contact means are employed for connecting either one or the other of the windings 6 and 7 to the lead 3 for operating the motor, and hence its connected load or controlled object 8', in opposite directions, said contact means serving also to connect these windings together and to a D. C. source when stopping the motor. This contact means is illustrated in Fig. 1 as consisting of a movable contact 9 connected to lead 3 and cooperating stationary contacts 10 and 10' connected, respectively, to the windings 6 and 7.

Winding 6 is shown connected through a condenser 11 to lead 4, whereas winding 7 is shown connected through a condenser 11' to lead 4. A source of direct current is connected through leads 12 and 13 to those terminals of windings 6 and 7 that are connected to condensers 11 and 11'.

In use, assuming that the movable contact 9 is positioned so as to engage the contact 10 alone, then current will flow from lead 3 through contacts 9 and 10, winding 6 and condenser 11 to lead 4, the condenser 11 serving to cause winding 6 to draw a leading current, thereby obtaining the desired phase displacement between the currents in main winding 2 and auxiliary winding 6 for causing the motor 1 to operate substantially as a two phase motor, a rotating field in one direction being produced by windings 2 and 6 to cause the rotor 8, and hence load 8', to turn in the corresponding direction. Inasmuch as the D. C. circuit is open between contacts 9 and 10' at this time, no D. C. flows in the auxiliary windings 6 or 7.

When it is desired to stop the motor, the contact 9 is moved so as to engage contacts 10 and 10' simultaneously, whereupon the auxiliary windings are connected in series across the direct current supply leads 12 and 13 and the fixed flux fields thus produced by these windings are additive and exert a powerful braking action upon the rotor 8, thereby bringing the motor to a stop in a dead beat manner. The D. C. flux produced by windings 6 and 7 substantially saturates the stator core, thereby nullifying the alternating flux field of main winding 2 so that this winding no longer exerts any driving force upon the rotor. With the D. C. supply connected to auxiliary windings 6 and 7, the impedance of these windings and that of the main winding 2 to the flow of A. C. from leads 3, 4 is greatly reduced and the A. C. current in these windings might become excessive but for the presence of ballast resistor 5, which restricts the A. C. current to a desired value.

If it is desired to operate the motor in the reverse direction from that previously described, the movable contact is moved to engage stationary contact 10' alone, whereupon A. C. is supplied to auxiliary winding 7 from lead 3 through contacts 9, 10', winding 7 and condenser 11' to lead 4. Winding 7 cooperates with winding 2 to produce a rotating field in the reverse direction from that obtaining when winding 6 was energized, thereby causing the motor to run in the reverse direction. It will be noted that condensers 11 and 11' serve to prevent lead 4 from short circuiting the D. C. source.

In Fig. 2 the invention is shown as applied to a positional control system wherein it is desired to control a rudder or other controlled object 14 in accordance with the movements of a handwheel or other controlling object 15. Handwheel 15 is shown connected for turning a bevel gear 16 that meshes with a bevel gear 17 constituting the arm of differential gearing. Arm 17 carries a gear 18 meshing with gears 19 and 20. Gear 19 is connected to a contact actuating cam 21. Cam 21 is adapted to actuate spring arms 31 and 31' carrying movable contacts 22 and 22' that cooperate with a stationary contact 24 and are connected by leads 23 and 23' to auxiliary windings 6 and 7 of the motor 1, the latter windings being connected, in turn, through condensers 11 and 11' to the lead 4. The main winding 2 of the motor is connected across the A. C. supply leads 3 and 4, as in Fig. 1 of the drawing, and the ballast resistance 5 is also employed as in Fig. 1.

Gear 20 of the differential is connected by a follow-up connection 26 to the motor rotor 8. This rotor is shown connected in driving relation through shaft 27 and gearing 28 to the rudder 14. The D. C. supply leads 12 and 13 of Fig. 2 are shown supplied from A. C. leads 3, 4 through the use of a suitable full wave rectifier. A transformer 29 is used for supplying rectifier elements 30 and 30', which may be of the oxide coated or other suitable type, the lead 13 being connected to the output of elements 30 and 30' and lead 12 being connected to the center tap of the secondary of transformer 29.

In use, with cam 21 in its neutral position, as shown in Fig. 2, both of the movable contacts 22 and 22' are held by the spring arms 31 and 31' in engagement with the stationary contact 24 that is connected to lead 3, whereby auxiliary windings 6 and 7 are connected in series across the D. C. leads 12, 13 so that the motor 1 is at standstill. Should the handwheel 15 be now turned, it will cause the turning of gear 19, since gear 20 is held stationary by rotor 8. The turning of gear 19 will cause cam 21 to turn and disconnect one of the movable contacts 22 or 22' from stationary contact 24, the movable contact thus disengaged depending upon the direction in which the handwheel is turned. The D. C. supply to windings 6 and 7 is thus broken, and the motor 1 is caused to operate in the proper direction to cause rudder 14 to follow the movement of handwheel 15, the follow-up connection 26 serving to return cam 21 to neutral position when the handwheel and rudder are again in synchronous positions. Owing to the dynamic braking of motor 8, the rudder 14 is prevented from overrunning or hunting, so that the system is exceedingly dead beat in operation.

Although the motor 1 has been illustrated as a two phase wound motor, it is apparent that other multiple phase motors may be used if desired. Thus, in Fig. 3 the principles of the invention are applied to a motor wound three phase. In this figure, two pairs of auxiliary windings are used, the pair 6', 7' and the pair 32, 33, each such pair constituting a phase winding of the motor, in addition to the remaining phase winding consisting of main winding 2'. The phase of the current in windings 6' and 7' is advanced by condensers 11 and 11' with respect to the main winding 2', whereas the phase of the current in windings 32 and 33 is retarded by choke coils 34 and 34' with respect to the main winding 2', thereby obtaining three phase operation. Condensers 35 and 35' and 11 and 11' prevent the shorting of the D. C. source. The operation of this form of the invention is similar to that of Fig. 1 and would appear to require no further description.

Also, the principles of the invention may be applied to motors other than induction motors. Thus, in Fig. 4 a reversible repulsion motor is illustrated, having stator windings 6' and 7' disposed at right angles to each other and having its armature 36 provided with short circuited brushes. When movable contact 9 engages stationary contact 10, the stator winding 6' is energized from the A. C. line 3', 4', causing armature 36 to turn in one direction, whereas when contact 9 engages contact 10' the stator winding 7' is energized from line 3', 4', causing armature 36 to turn in the reverse direction. When movable contact 9 is caused to engage both contacts 10 and 10' simultaneously, direct current from leads 12 and 13 energizes both stator windings 6' and 7', thereby producing fixed fields for dynamically braking the motor. Condensers 11 and 11' prevent the shorting of the D. C. source. The ballast resistor 5 limits the A. C. current in windings 6' and 7' when the motor is idle.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In an electrical control system, an A. C. motor having windings arranged to be supplied from an A. C. source, control means for said motor for controlling the operation thereof, said control means serving to operatively connect a portion of said windings to a D. C. source to effect the stopping of said motor while maintaining the connection of said portion of said windings to said A. C. source.

2. In an electrical control system, an A. C. motor having main and auxiliary windings arranged to be supplied from an A. C. source, control means for regulating the A. C. supply to said auxiliary windings to control the direction of operation of said motor, said control means also serving to connect said auxiliary windings to a D. C. source to effect the rapid stoppage of said motor, due to the flow of D. C. through said auxiliary windings.

3. In an electrical control system, a multiple phase motor arranged to be supplied from a single phase source, said motor having main and selectively energized auxiliary winding sections, and means for supplying D. C. to said auxiliary winding sections to cause dynamic braking of said motor.

4. In an electrical control system, a multiple phase motor arranged to be supplied from a single phase source, said motor having main and selectively energized auxiliary winding sections, impedance means for shifting the phase of the current in said auxiliary winding sections to obtain multiple phase operation of said motor, and control means for operatively connecting said auxiliary winding sections to a source of D. C. to cause the stopping of said motor, the supply of D. C. to said auxiliary winding sections serving to provide a fixed flux for dynamically braking said motor.

5. In an electrical control system, an induction motor having a main winding arranged to be supplied from an A. C. source and a pair of auxiliary windings, control means for selectively connecting either one or the other of said auxiliary windings to said A. C. source to cause said motor to operate in opposite directions, said control means also serving to connect said auxiliary windings in series across a D. C. source to cause dynamic braking of said motor.

6. In an electrical control system, an induction motor having multiple phase windings arranged to be supplied from a single phase source, one of the phase windings of said motor being connected permanently across said single phase source, a controlling member for connecting the remaining phase windings selectively to said A. C. source for operating said motor in opposite directions, impedance means connected to said remaining phase windings to provide currents of proper phase therein, a controlled member driven by said motor, said controlling member also serving to connect said remaining phase windings in series across a D. C. source to cause dynamic braking of said motor and the immediate stoppage of said controlled member.

7. In an electrical control system, an induction motor having multiple phase windings, one of said phase windings being permanently connected across a single phase A. C. source, and another of said phase windings having two like winding portions, control means for selectively and operatively connecting dissimilar ends of said winding portions to one side of said A. C. source for operating said motor in reverse directions, the remaining ends of said winding portions being permanently electrically connected to the other side of said A. C. source, a D. C. source connected to the remaining ends of said winding portions, said control means serving to also connect said dissimilar ends of said winding portions together, whereby the same are connected in series across said D. C. source to cause dynamic braking of said motor.

8. In an electrical control system, an induction motor having multiple phase windings, one of said phase windings being permanently connected across a single phase A. C. source, and another of said phase windings having two like winding portions, control means for selectively connecting dissimilar ends of said winding portions to one side of said A. C. source for operating said motor in reverse directions, impedances interposed between the remaining ends of said winding portions and the other side of said A. C. source, a D. C. source connected to said remaining ends of said winding portions, said control means serving to also connect said dissimilar ends of said winding portions together, whereby the same are connected in series across said D. C. source to cause dynamic braking of said motor.

9. In an electrical positional control system, a controlling object, a controlled object, an induction motor for driving said controlled object, said induction motor having one phase winding permanently connected to an A. C. source and another phase winding consisting of like winding portions, and contact means actuated in response to relative movements of said controlling and controlled objects for selectively connecting dissimilar ends of said winding portions to one side of said A. C. source to cause relative operation of said motor in opposite directions, the remaining ends of said winding portions being permanently electrically connected to the other side of said A. C. source, said contact means also serving, when said objects reach synchronism, to connect said winding portions in series across a D. C. source to thereby dynamically brake said motor and bring said controlled object to an immediate stop.

10. A positional control system of the character described, comprising a controlling object, a controlled object, motive means having a plurality of stator windings and connected for driving said controlled object, a control circuit for said motive means, said control circuit having switch means, responsive to the relative displacement of said objects, for selectively supplying A. C. to said stator windings to control said motive means in accordance with the relative displacement of said objects, said switch means being responsive to the establishment of synchronism between said objects to connect certain of said stator windings to a D. C. source to effect the dynamic braking of said motive means and the stopping of said controlled object in a dead beat manner.

11. A positional control system of the character described, comprising a controlling object, a controlled object, motive means having multiple phase windings including one phase winding continuously energized from a single phase source, and a rotor connected for driving said controlled object, a control circuit for said motive means, said circuit having switch means, responsive to the relative displacement of said objects, for selectively connecting portions of the remaining phase windings to said source to control said motive means in accordance with the relative displacement of said objects, said control circuit including impedance means between said remaining phase windings and said source to obtain multiple phase operation of said motive means, said switch means serving to connect said remaining phase windings in series across a D. C. source when stopping said motive means.

12. In an electrical control system, a multiple phase motor arranged to be supplied from a single phase source, said motor having main and selectively energized auxiliary winding sections, means for limiting the current flow from said source through said main and auxiliary windings, and means for supplying D. C. to said auxiliary winding sections to cause dynamic braking of said motor.

13. In an electrical control system, a multiple phase motor arranged to be supplied from a single phase source, said motor having main and auxiliary winding sections, impedance means for shifting the phase of the current in said auxiliary winding sections to obtain multiple phase operation of said motor, control means for operatively connecting said auxiliary winding sections to a source of D. C. to cause the stopping of said motor, the supply of D. C. to said auxiliary winding sections serving to provide a fixed flux for dynamically braking said motor, and a ballast resistance for limiting the flow of A. C. current through said motor windings.

14. In an electrical control system, an A. C. motor having windings arranged to be supplied from an A. C. source, control means for said motor for controlling the operation thereof, said control means serving to operatively connect a portion of said windings to a D. C. source to effect the stopping of said motor while maintaining the connection of said windings to said A. C. source, and said control means serving to interrupt the flow of D. C. to said winding portion when said motor is running.

15. In an electrical control system, an A. C. motor having stator windings arranged to be selectively supplied from an A. C. source to obtain reversible operation of said motor, and means for supplying D. C. to said windings to effect the dynamic braking of said motor while maintaining the connection of said windings to said A. C. source.

FREDERIC M. WATKINS.